(12) United States Patent
Harrington et al.

(10) Patent No.: US 7,297,254 B1
(45) Date of Patent: Nov. 20, 2007

(54) SYSTEMS AND METHODS FOR EXTRACTING AND PURIFYING WATER FROM GROUNDWATER SOURCES

(75) Inventors: Michael J. Harrington, 120 128th Ave. SE., Bellevue, WA (US) 98005; Katherine Reinleitner, Bellevue, WA (US)

(73) Assignees: Michael J. Harrington, Seattle, WA (US); Katherine Reinlictner, Seattle, WA (US)

(*) Notice: Subject to any disclaimer, the term of this patent is extended or adjusted under 35 U.S.C. 154(b) by 0 days.

(21) Appl. No.: 11/488,206

(22) Filed: Jul. 18, 2006

(51) Int. Cl.
*C02F 1/78* (2006.01)

(52) U.S. Cl. ............... 210/170.07; 210/199; 210/416.3

(58) Field of Classification Search ................ 210/170, 210/220, 416.3, 170.07, 192, 198.1, 199; 261/77, 123, DIG. 42; 166/372; 417/108, 417/110
See application file for complete search history.

(56) References Cited

U.S. PATENT DOCUMENTS

| | | | | |
|---|---|---|---|---|
| 1,339,137 A | * | 5/1920 | Rogers | 417/108 |
| 1,483,877 A | * | 2/1924 | Gracey | 417/108 |
| 1,811,295 A | * | 6/1931 | Blow | 417/108 |
| 4,780,215 A | * | 10/1988 | Carlson | 210/722 |
| 5,620,593 A | * | 4/1997 | Stagner | 210/90 |
| 5,900,143 A | * | 5/1999 | Dalton et al. | 210/192 |
| 5,980,751 A | * | 11/1999 | Chancellor | 210/652 |
| 6,103,108 A | | 8/2000 | Kohlenberg | |
| 6,174,437 B1 | | 1/2001 | Haney | |
| 6,264,176 B1 | * | 7/2001 | Dickman et al. | 261/77 |
| 6,395,182 B1 | | 5/2002 | Van Winkelen et al. | |
| 7,007,759 B2 | | 3/2006 | Harrington et al. | |
| 7,036,577 B2 | | 5/2006 | Minamijima et al. | |
| 7,077,208 B2 | | 7/2006 | Harrington et al. | |
| 2003/0189010 A1 | | 10/2003 | Wihelm | |
| 2004/0222151 A1 | | 11/2004 | Lee et al. | |
| 2006/0011553 A1 | | 1/2006 | Nightingale | |

* cited by examiner

*Primary Examiner*—Matthew O. Savage
(74) *Attorney, Agent, or Firm*—Schwegman, Lundberg, Woessner & Kluth, P.A.

(57) ABSTRACT

Systems and methods for water extraction and purification are disclosed. In one embodiment of the invention, a system includes at least one water lifting unit that fluidly communicates with a groundwater source, and a gas generator that is fluidly coupled to the at least one water lifting unit to generate a gas that buoyantly moves water from the groundwater source to a water consumer.

12 Claims, 6 Drawing Sheets

SYSTEMS AND METHODS FOR EXTRACTING AND PURIFYING WATER FROM GROUNDWATER SOURCES

FIELD OF THE INVENTION

This invention relates generally to water extraction and processing, and more particularly to systems and methods for extracting and purifying water recovered from a groundwater source.

BACKGROUND OF THE INVENTION

Although water occupies a substantial portion of the Earth's surface, a relatively small portion (approximately about one percent) of this water is fresh water. Of that portion, even less is immediately suitable for human consumption. In most cases, the available fresh water must be recovered and suitably processed in order to eliminate dangerous water borne pathogens that may be present. In most developed nations of the world, water treatment and pumping plants are generally available to recover the water from surface or subterranean sources and to suitably treat the water so that it is safe for human consumption. The water treatment and pumping plant may then provide the suitably treated water to a distribution network so that safe drinking water is supplied to various water consumers over a widespread area.

In contrast, in the developing nations of the world, safe drinking water is typically unavailable due to economic as well as climatic reasons. For example, constructing and maintaining suitable water treatment and pumping plants is not economically obtainable in most cases due to the relatively high cost associated with these plants. Moreover, since many portions of the developing world are typically arid, the only suitable water is available from deep groundwater sources that are relatively expensive to exploit, due to the relatively deep well that must be drilled, and the large pumping plant that is required to extract useable volumes of water. Consequently, most drinking water is locally obtained from any available water source. Typically, relatively shallow groundwaters are extracted from boreholes or shallow wells to provide useable amounts of drinking water. Unfortunately, water obtained from shallow groundwater sources is generally of a low bacteriological quality (e.g., having a relatively high bacteriological concentration).

Accordingly, many persons in the developing world do not have access to adequate amounts of safe drinking water, which has adversely affected the state of public health in these regions. For example, drinking water of substandard quality has significantly contributed to infant mortality in the developing world. According to recent estimates, infant mortality rates in the underdeveloped world range between approximately 160 and 180 deaths per one-thousand live births, as compared with approximately five to seven deaths per one-thousand live births in the developed world. One factor that significantly contributes to the high infant mortality rate in the developing world are the various waterborne diseases such as cholera, typhoid fever, dysentery, gastroenteritis and others that are frequently present in drinking water.

There is therefore a distinct need to provide an apparatus and method that provides potable water in sufficient quantities. At present, approximately one in three children on the African continent are affected by drinking contaminated water. As a consequence, more children die due to diarrhea contracted from contaminated drinking water than from any other single cause. Since a child suffering from diarrhea necessarily consumes resources than are not required by ordinary, healthy children. For example, caring for the sick child requires intravenous fluids, sterile set-ups and a nurse and/or physician who can administer them. Sterile intravenous set-ups and nurses and/or physicians to administer them are all too scarce in rural Africa. In severe cases, the child may require a hospital or clinic. This is often very difficult, or even impossible since transporting the sick child through rural areas of African countries may not be possible. Still further, since babies dehydrate so quickly, the child often will die while being transported to the hospital or clinic. Accordingly, in the unlikely event that the child survives by receiving adequate care, the child may become infected again quite soon, if a new source of clean water is not found.

In most of Africa, the primary contaminant in the ground water is bacteria. At present, to obtain relatively uncontaminated water, wells are dug very deep, often to depths of more than 200 feet. The cost associated with establishing deep wells is very high, often in the range of approximately about $20,000 (USD). Moreover, deep wells further require powerful submersible pumps to extract water from the well. Accordingly, large amounts of electrical power are required, which is generally scarce in underdeveloped regions. Suitable submersible pumps further require engineering support to install and maintain the pump, and to make certain that it has an adequate power source to operate the pump. Obviously, the necessary engineering support is generally also unavailable in underdeveloped regions, such as rural Africa.

What is needed in the art are systems and methods for extracting and purifying water so that relatively contaminated water sources may be used to provide useful amounts of safe drinking water.

SUMMARY

The present invention comprises systems and methods for water extraction and purification. In one aspect, the invention includes at least one water lifting unit that fluidly communicates with a groundwater source, and a gas generator that is fluidly coupled to the at least one water lifting unit to generate a gas that buoyantly moves water from the groundwater source to a water consumer.

BRIEF DESCRIPTION OF THE DRAWINGS

Embodiments of the present invention are described in detail below with reference to the following drawings.

DETAILED DESCRIPTION

The present invention relates to systems and methods for extracting and purifying water recovered from groundwater sources. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without several of the details described in the following description. It is also understood that the term "groundwater" may refer to water recoverable from subterranean sources as well as water recovered from surface bodies of water, such as streams, ponds, marshes and other similar bodies of water. Still further, it is also understood that the term "water purification" may refer to one or more of a water disinfectant process, a sediment removal process, or the removal of any other undesired water contaminant, such as a water deionization process.

Figure 1:
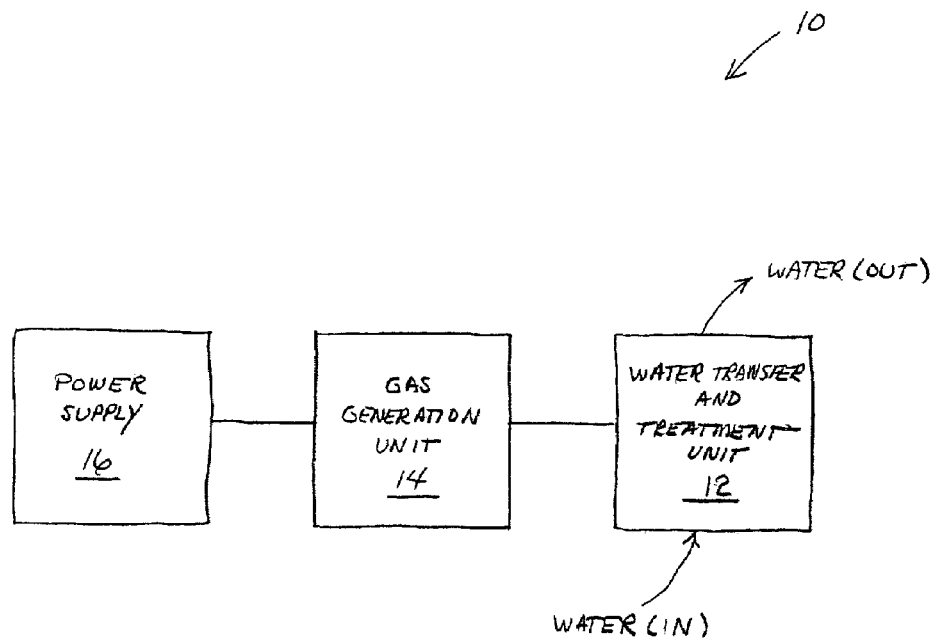
FIG. 1 is a block diagrammatic view of a system for extracting and purifying water obtained from a groundwater source, according to an embodiment of the invention.

FIG. 1 is a block diagrammatic view of a system 10 for extracting and purifying water obtained from a groundwater source, according to an embodiment of the invention. The system 10 includes a water transfer and treatment unit 12 that is operable to accept water at a first end of the water transfer and treatment unit 12 and move the water to an opposing second end of the water transfer and treatment unit 12. Briefly, and in general terms, the water transfer and treatment unit 12 is configured to move the water by receiving a compressed gas from a gas generation unit 14 so that a relatively low density gas-water mixture is generated, so that the gas-water mixture moves by buoyant forces from the first end of the water transfer and treatment unit 12 to the second end. The water transfer and treatment unit 12 will be described in greater detail below.

The gas generation unit 14 is operable to provide a compressed gas at a predetermined pressure and flow rate to the water transfer and treatment unit 12. In one specific embodiment, the gas generation unit 14 includes any self-contained compressed gas source, such as a pressure vessel configured to contain the compressed gas, and a suitable pressure regulation device coupled to the pressure vessel that is configured to provide the predetermined pressure and flow rate to the water transfer and treatment unit 12. In another specific embodiment, the gas generation unit 14 is a mechanical gas compression device, such as a mechanically driven diaphragm compressor, which may be coupled to a suitable pressure vessel to store the compressed gas. One suitable diaphragm compressor is available from KNF Neuberger, Incorporated of Trenton, N.J., although other alternatives exist. In another specific embodiment, a chemical gas generator may be used to provide the compressed gas. The chemical gas generator provides the compressed gas through a chemical reaction between selected reactants. Alternately, the reaction may involve a reactant that is exposed to a selected catalyst, so that the compressed gas is generated. For example, the reactant may include hydrogen peroxide that is exposed to a transition metal catalyst, so that steam and oxygen are evolved from the reaction.

In any case, the gas generation unit 14 also includes a water purification device (not shown in FIG. 1). The water purification device is configured to controllably release a water purification agent into the compressed gas that is, in turn, supplied to the water transfer and treatment unit 12. The water purification agent may include chlorine gas, or other compounds of chlorine, such as chlorine dioxide, chloramines and sodium hypochlorite. In a specific embodiment, however, the water purification agent is at least one of the well-known allotropic forms of oxygen, such as ozone. Accordingly, the water purification device may include any device that is configured to generate sufficiently useful amounts of ozone. For example, the water purification device may include known devices that are operable to generate ozone using ultraviolet illumination sources or corona discharge sources. One example of a suitable ozone generator is the AOS-1MP Corona Discharge Ozone Generator, available from applied Ozone Systems, Incorporated of Auburn, Calif., although other suitable alternatives are readily available. Depending upon a desired water purity value, the selected purifying agent, as well as other factors, the water purification device is further configured to provide the selected agent to the gas at a predetermined rate. When a chemical gas generator is used, the reaction that generates the gas may also include the purification agent. For example, when hydrogen peroxide is evolved by the reaction, the hydrogen peroxide may also serve as an effective water purification agent. In other embodiments, the water purification device may be configured to controllably release a halide-based purification agent into the compressed gas.

Still referring to FIG. 1, the system 10 also includes a power supply 16 that is operably coupled to the gas generation unit 14. In one embodiment, the power supply 16 is configured to provide electrical energy at a desired voltage and current to the gas generation unit 14 to energize the mechanical gas compression device and/or the water purification device. Accordingly, the power supply 16 may include an alternating current (AC) power source (such as an existing AC power distribution network) that may be rectified by known methods to generate direct current power (DC), if desired. The power supply 16 may also include one or more storage batteries, which may be coupled to a suitable inverter device if AC is required by at least one of the mechanical gas compression device and/or the water purification device. Alternately, the power supply 16 may also include one or more photovoltaic units (e.g., "solar cells") that are operable to provide electrical energy in response to illumination of the photovoltaic units from an illumination source. The photovoltaic units may be further coupled to one or more storage batteries so that electrical energy may be provided to the gas generation unit 14 during periods when the illumination source provides minimal, or even no illumination to the photovoltaic units.

Still other devices may be used to supply electrical energy to the gas generation unit 14. For example, in another specific embodiment, the power supply 16 may include a manually operated electrical generator (or alternator) that is suited to receive a power input from a human or an animal locomotive source. Alternately, the electrical generator may be coupled to a prime mover, such as a gasoline engine, a diesel engine, or other known prime movers. The power supply 16 may also include a fuel cell device, such as a direct methanol fuel cell (DMFC) device that generates an electrical current in response to the oxidation of methanol in the presence of a catalyst. One suitable DMFC device is the SFC A50 DMFC, available from SFC Smart Fuel Cell AG, of Germany, although other alternatives exist.

Figure 2:
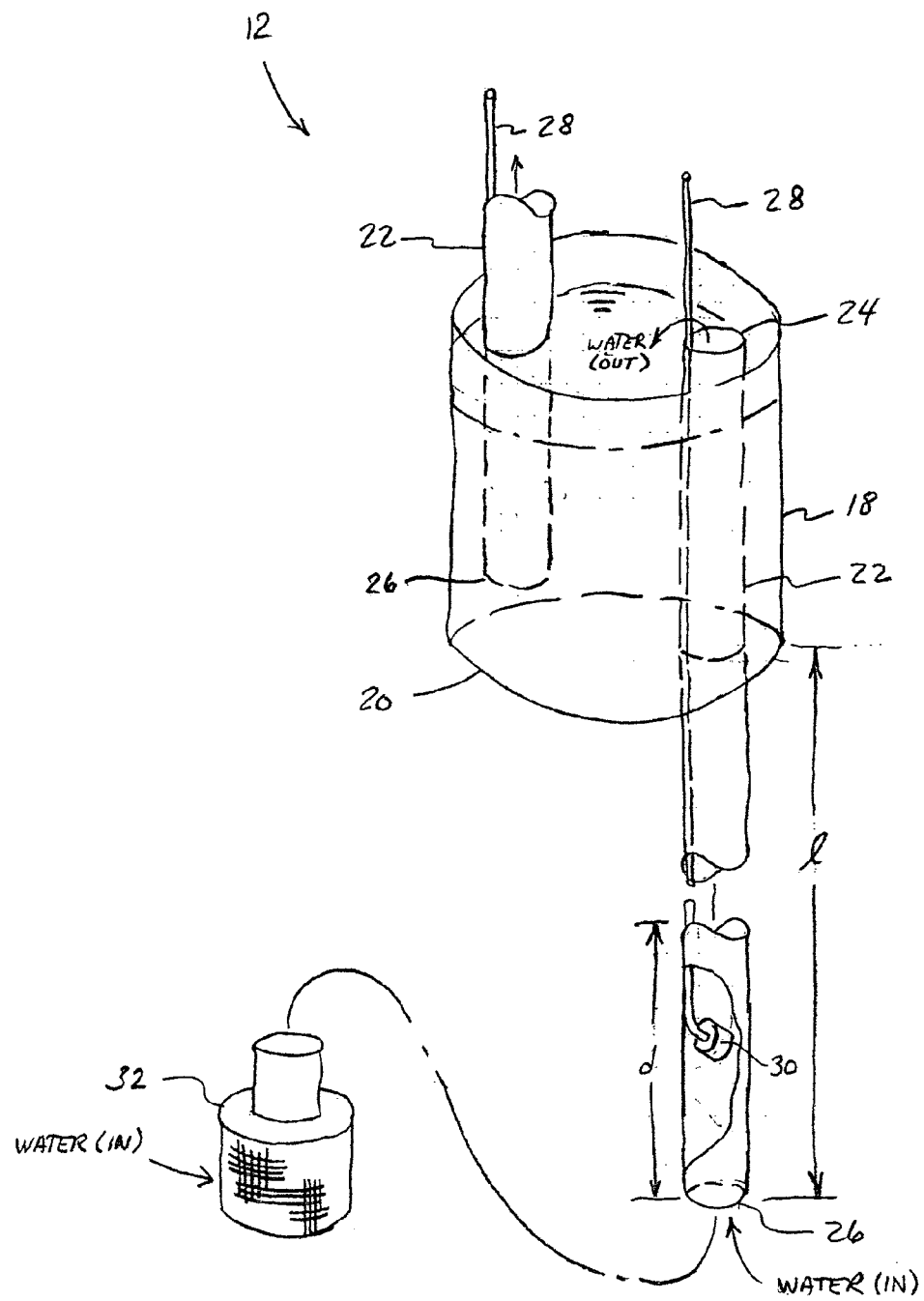
FIG. 2 is a partial isometric view of the water transfer unit of FIG. 1, according to another embodiment of the invention.

FIG. 2 is a partial isometric view of the water transfer and treatment unit 12 of FIG. 1, according to another embodiment of the invention. The water transfer and treatment unit 12 includes a water collector 18 having an interior volume and a sealed end 20 that is configured to contain a corresponding volume of water. Although not shown in FIG. 2, the water collector 18 may also include an activated carbon bed that promotes adsorption of various undesired metals and compounds. In other alternative embodiments, the activated carbon bed may be positioned in other portions of the unit 12. A lift tube 22 includes a first end 24 that sealably extends through the sealed end 20 and into the interior volume of the water collector 18, and an opposing second end 26 that extends outwardly from the sealed end 20 for a selected distance 1. The lift tube 22 also includes a gas emitter tube 28 that extends longitudinally along at least a portion of a length of the lift tube 22 and extends outwardly from the first end 24 of the lift tube 22 so that the gas emitter tube 28 may be coupled to the gas generation unit 14 (FIG. 1). The gas emitter tube 28 also includes a gas emitter 30 that is coupled to a distal end of the gas emitter tube 28 and positioned proximate to the second end 26 of the lift tube 22. For clarity of illustration, a portion of the lift tube 22 has been cut away to illustrate this structural detail. Although FIG. 2 shows the gas emitter tube 28 extending along a length of the lift tube 22, it is understood that the gas emitter tube 28 may be oriented in other directions. For example, the gas emitter tube 28 may project through a wall of the lift tube 22 and extend laterally outwardly from the lift tube 22 in any desired direction. In other specific embodiments, the gas emitter tube 28 may be coiled about the lift tube 22.

The gas emitter 30 may be comprised of a generally porous material having a selected porosity that permits a gas supplied to the gas emitter tube 28 to be released into an interior portion of the lift tube 22. Accordingly, the gas emitter 30 may be formed from a metal, such as bronze, or other similar metals that is sintered. Alternately, the gas emitter 30 may be formed from a fused granular material such as silica sand, or other similar granular materials. Still other materials may be used to form the gas emitter 30. For example, the gas emitter 30 may be formed from a fired, non-glazed porcelain material. The gas emitter 30 may also be formed from a polymeric material having a desired porosity. Although FIG. 2 shows a gas emitter formed from a generally porous material, it is understood that the gas emitter 30 may also be comprised of a gas emitter tube 28 having a closed end with one or more apertures projecting through a wall portion of the gas emitter tube 28. It is further understood that the gas emitter 30 may also be comprised of an open end of the gas emitter tube 28.

The water transfer and treatment unit 12 may include a filter device 32 configured to be received by the second end 26 of the lift tube 22 that is operable to prevent undesired solid material from entering the lift tube 22 when water is introduced into the lift tube 22. Accordingly, the filter device 32 may include a screen formed from a woven material having a desired open area to exclude the solid material from the lift tube 22. Alternately, the filter device 32 may also include a filter matrix comprised of a relatively dense network of fibers that is operable to trap and retain relatively small solid materials that may be present in the water. Although FIG. 2 shows the filter device 32 coupled to the second end 26 of the lift tube 22, it is understood that the filter device 32 may be coupled to other selected portions of the water transfer and treatment unit 12.

Still referring to FIG. 2, the operation of the water transfer and treatment unit 12 will now be described in detail. With the second end 26 of the lift tube 22 immersed in water to at least a depth d that is sufficient to fully immerse the gas emitter 30 below a surface of the water. The depth d is also generally at least a height sufficient to provide a balancing head between the pure water outside the tube 22 and the gas-water mixture existing at the first end 24. The gas generation unit 14 transfers the gas at a predetermined flow rate and pressure through the gas emitter tube 28 to the gas emitter 30. Gas released from the gas emitter 30 mixes with the water surrounding the gas emitter 30 and forms a gas-water mixture of relatively lower density. Accordingly, the gas-water mixture moves through the lift tube 22 and towards the water collector 18, so that a pumping head is developed that draws additional water into the second end 26 of the lift tube 22. Upon reaching the first end 24 of the lift tube 22, the gas-water mixture is introduced into the water collector 18, where the water component of the mixture is captured, while the gas component is released. Since the gas component in the gas-water mixture may include a water purification agent, the water component is subject to purification as it moves within the collector 18 and the lift tube 22. Since the gas provided to the gas emitter tube 28 may be selectively regulated, a residence time for the exposure of the water to the water purification agent may be continuously adjusted. It will be readily appreciated that a plurality of units 12 may be serially coupled to transport water through various distances, as will be described in greater detail below. Accordingly, as shown in FIG. 2, a second end 26 of the lift tube 22 that corresponds to an adjacent unit 12 is positioned within the water collector 18 so that water may be further transported from the collector 18 and into the lift tube 22 of the adjacent unit 12. It is also understood that water may be repeatedly routed through one or more of the units 12 in order to achieve an enhanced water purification effect.

Figure 2A:
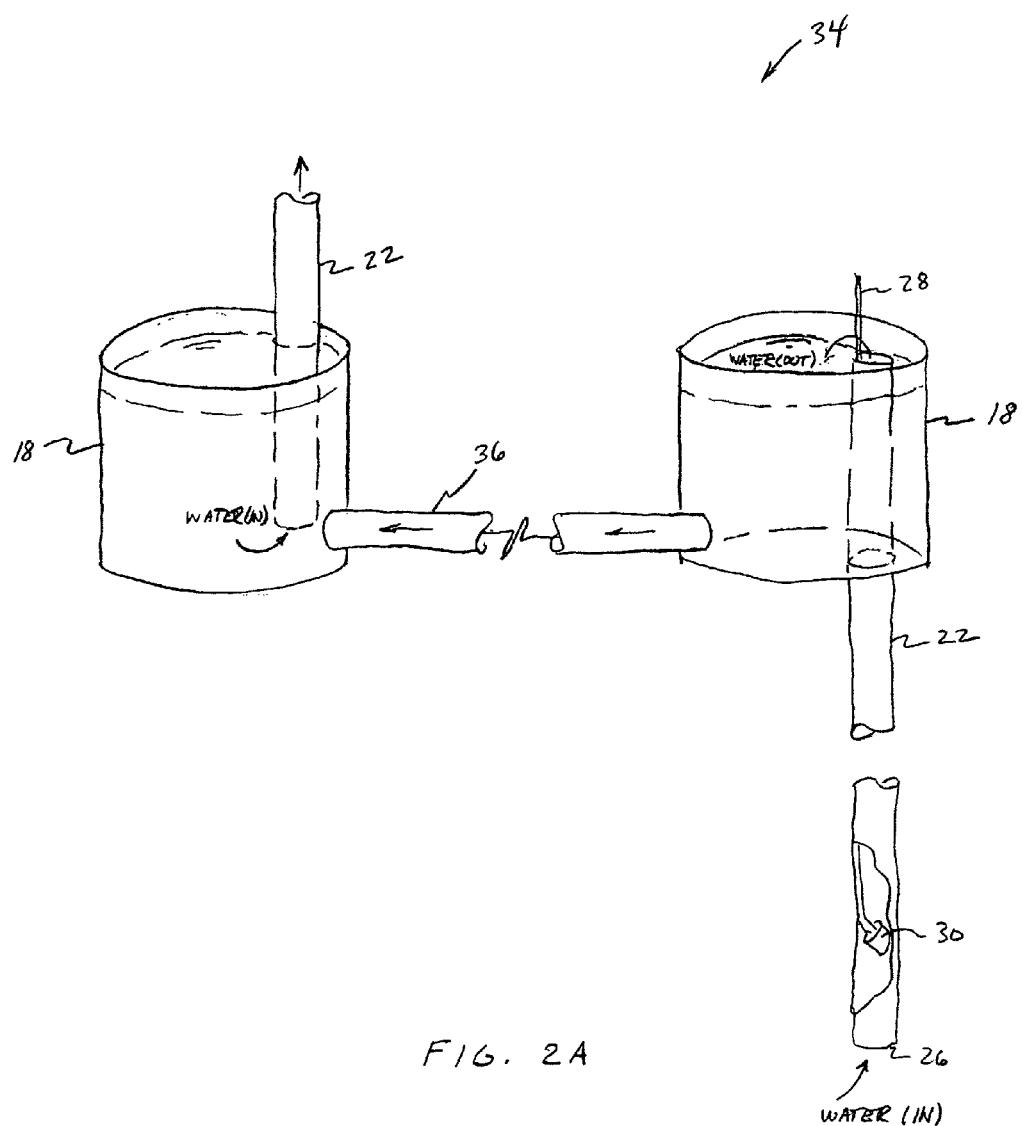
FIG. 2A is a partial isometric view of a water transfer unit, according to another embodiment of the invention.

FIG. 2A is a partial isometric view of a water transfer unit 34, according to another embodiment of the invention. Many of the details of the embodiment shown in FIG. 2A have been described in detail in connection with the embodiment shown in FIG. 2. Accordingly, in the interest of brevity, these details will not be described further. The water transfer unit 34 includes a fluid transfer line 36 that fluidly couples a pair of laterally spaced-apart water collectors 18. Accordingly, the water transfer unit 34 is operable to move the water in a lateral direction as it is generally moved upwardly.

Figure 3:
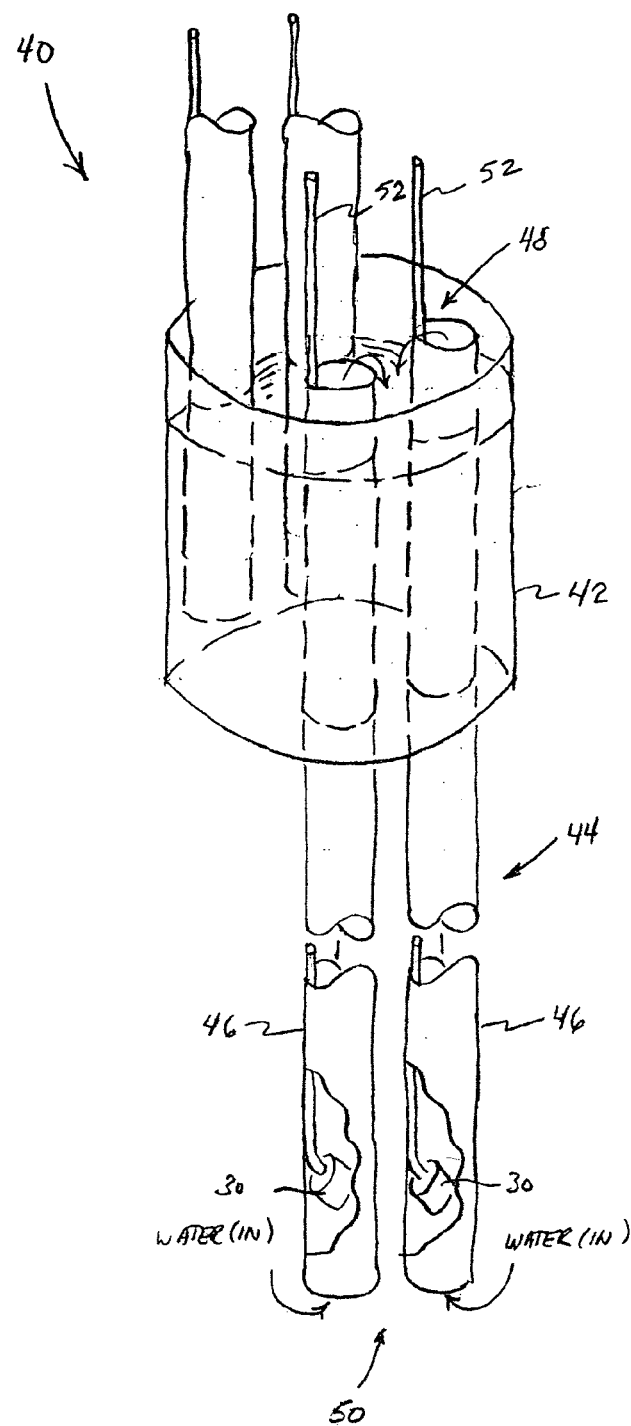
FIG. 3 is a partial isometric view of a water transfer unit, according to another embodiment of the invention.

FIG. 3 is a partial isometric view of a water transfer unit 40, according to another embodiment of the invention. The water transfer unit 40 includes a water collector 42, which may be substantially as described in connection with the embodiment shown in FIG. 2. The water collector 42 is coupled to a lift assembly 44 that includes more than one lift tube 46. Each of the lift tubes 46 may also be substantially as described in connection with FIG. 2. Accordingly, each of the lift tubes 46 is configured to generate a pumping head that is operable to transfer water to a first end 48 of the lift assembly 44 from a second end 50. Although the lift assembly 44 shown in FIG. 3 includes a pair of the lift tubes 46 having approximately similar diameters and lengths, it is understood that more than two of the lift tubes 46 may be included in the lift assembly 44, and that the lift tubes 46 may have different diameters and/or lengths. Additionally, each of the lift tubes 46 in the lift assembly 44 may be independently actuated so that a pumping head may be independently generated in each of the lift tubes 46 by selectively providing gas to the lift tubes 46. Further, although the lift assembly 44 shown in FIG. 3 includes a pair of spaced-apart lift tubes 46, it is understood that the lift assembly 44 may be fabricated as a unitary assembly, wherein the lift tubes 46 are mutually fixedly joined together.

The foregoing embodiment advantageously allows greater volumetric flow rates to be transferred than is generally achievable using a single lift tube. Further, since the foregoing embodiment provides more than one lift tube 46, the water transfer unit 40 will continue to pump water to the water collector 42 when one or more of the lift tubes 46 become inoperable due to clogging of the tube 46, or by failure of the gas emitter 30, or due to other reasons. Still other advantages are apparent in the foregoing embodiment. For example, since the lift tubes 46 may be independently controlled (e.g., by separately controlling a gas flow rate and/or pressure delivered to the gas emitter 30), the volumetric flow rate of the water transfer unit 40 may be selectively adjusted to provide a desired volumetric flow rate.

Figure 4:
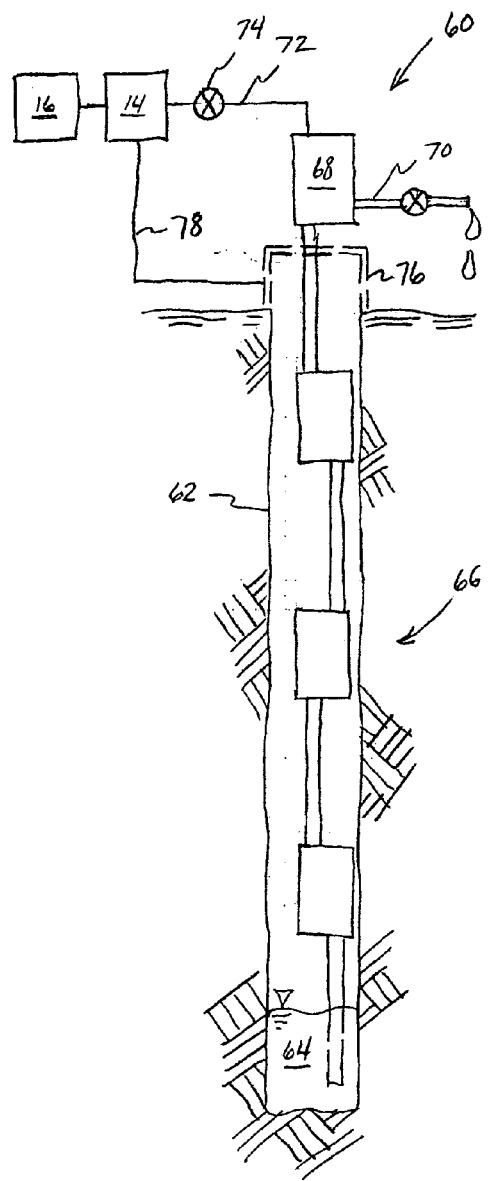
FIG. 4 is a side-elevational view of a groundwater pumping apparatus, according to another embodiment of the invention.

FIG. 4 is a side-elevational view of a groundwater pumping and purification apparatus 60 according to another embodiment of the invention. The apparatus 60 is configured to be positioned within an earthen excavation 62, such as a borehole, or a well, so that a portion of the apparatus 60 is in fluid communication with a water pool 64 that occupies a lower portion of the excavation 60. The apparatus 60 includes a pumping stack 66 that extends downwardly into the excavation 60, and includes one or more of the water transfer and treatment units 12 and the water transfer unit 40 of FIG. 2 and FIG. 3, respectively. The water transfer and treatment unit 12 and/or the water transfer unit 40 may be serially coupled to fully extend into a water pool 64 in the lower portion of the excavation 60. Although not shown in FIG. 4, it is nevertheless understood that the pumping stack 66 may also include a supporting structure that is fixedly coupled to each of the water transfer units to impart sufficient structural rigidity to the pumping stack 66. The apparatus 60 also includes a main collector 68 that may be used to collect water that is pumped upwardly by the pumping stack 66. The main collector 68 may include one or more taps 70 that are fluidly coupled to the main collector 68 so that water pumped by the pumping stack 66 may be removed from the apparatus 60. The main collector 68 may also include a gas emitter interface 72 that is operably coupled to the gas generation unit 14, as shown in FIG. 1. The gas emitter interface 72 may include a gas flow regulation device 74 that is configured to control an amount of gas provided to the interface 72. The interface 72 may be configured to provide different gas flow rates to the water transfer and treatment unit 12 and/or the water transfer unit 40 comprising the pumping stack 66. Accordingly, a pumping rate and/or a residence time for the purification agent may be effectively adjustably controlled. A gas recovery cap 76 may be positioned at an upper portion of the excavation 62 that is suitably configured to capture the purification agent released within the excavation 62, and to route the recovered purification agent to the gas generation unit 14 through a recovery line 78.

The foregoing embodiment advantageously allows water to be extracted from wells and/or bore holes having at least a moderate depth by serially coupling water transfer units to form a unitary pumping stack. The pumping stack also desirably permits the water purification agent to reside in the water for a prolonged time period, thus enhancing the water purification effect.

Figure 5:
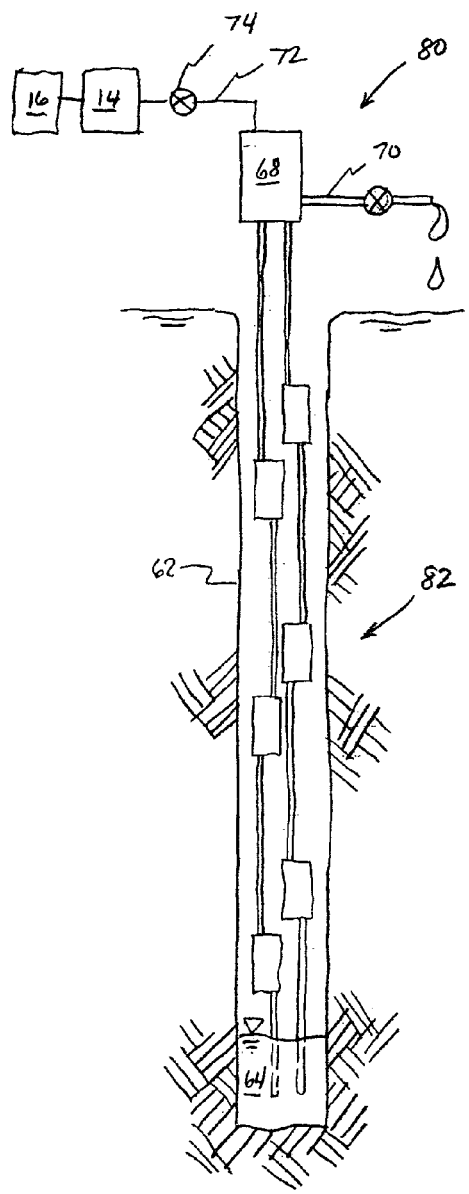
FIG. 5 is a side-elevational view of another groundwater pumping apparatus, according to another embodiment of the invention.

FIG. 5 is a side-elevational view of another groundwater pumping and purification apparatus 80 according to another embodiment of the invention. Many of the details of the present embodiment have been discussed in conjunction with the embodiment shown in FIG. 4. Accordingly, in the interest of brevity, these details will not be described further. The apparatus 80 includes more than one pumping stack 82, which are positionable within the excavation 62 so that parallel pumping paths are established. The more than one pumping stack 82 includes one or more of the water transfer and treatment unit 12 of FIG. 2 and the water transfer unit 40 of FIG. 3, which may be serially coupled to fully extend into the water pool 64 located in the excavation 62. As noted previously, the pumping stack 82 may also include a supporting structure that is fixedly coupled to each of the water transfer units to impart a structural rigidity to the pumping stack 82. A main collector 68 is also provided to collect water that is pumped upwardly by the pumping stack 82, and which may also include a gas emitter interface 72 coupled to the gas generation unit 14 (FIG. 1).

In addition to other advantages previously described, the foregoing embodiment advantageously allows water to be extracted along more than a single pumping path, thus affording greater flow control while also providing at least one redundant water flow path so that the overall reliability of the apparatus is enhanced.

Figure 6:
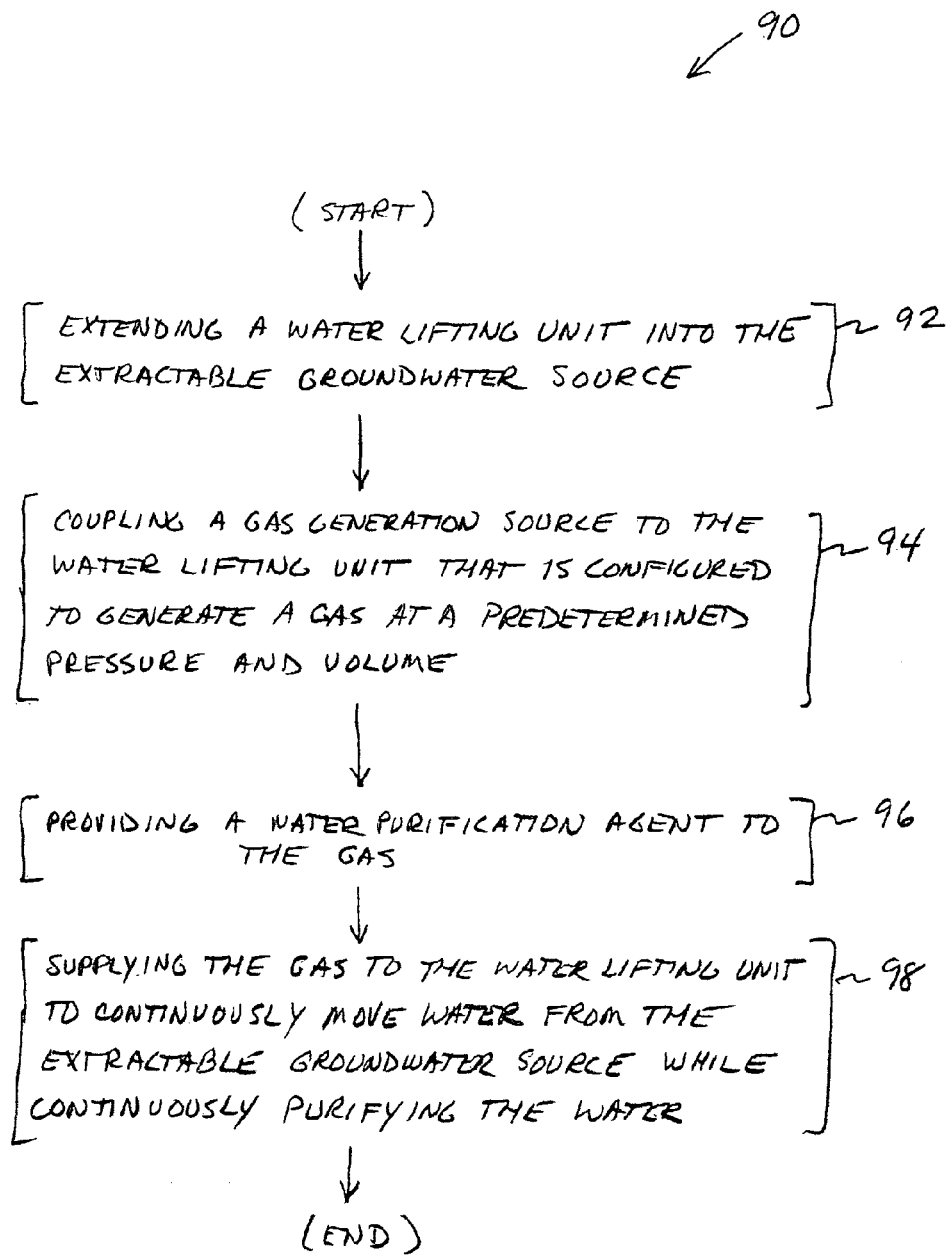
FIG. 6 is a flowchart that describes a method of extracting and purifying water recovered from a groundwater source.

FIG. 6 is a flowchart that will be used to describe a method 90 of extracting and purifying water recovered from a groundwater source, according to another embodiment of the invention. At block 92, a water lifting unit is extended into the extractable groundwater source, which may include subterranean sources, as well as surface bodies of water that contain extractable amounts of water. At block 94, a gas generation source is coupled to the water lifting unit. The gas generation source is configured to generate a gas at a predetermined pressure and volume. The gas may include air that is compressed to the predetermined pressure and volume by an air compression device, as previously described in detail. At block 96, a water purification agent may be added to the gas before the gas is introduced to the water lifting unit. At block 98, the gas that includes the purification agent is supplied to the water lifting unit. Accordingly, water is continuously moved from one end of the water lifting unit to an opposing end of the unit by forming a gas-water mixture having reduced density. While the water is moving through the water lifting unit, the water purifying agent advantageously continuously purifies the water extracted from the groundwater source.

While various embodiments of the invention have been illustrated and described, as noted above, many changes can be made without departing from the spirit and scope of the invention. For example, embodiments may be combined without significant modification to yield still further embodiments. Accordingly, the scope of the invention is not limited by the disclosure of the various embodiments. Instead, the invention should be determined entirely by reference to the claims that follow.

What is claimed is:

1. A water extraction and purification system, comprising:
   at least one water lifting unit that is configured to fluidly communicate with a groundwater source, the water lifting unit including a water collector having an interior volume that is structured to retain a volume of the water, the water collector having a closed bottom and an open top, at least one upper lift tube extending through the open top into the volume and configured to remove water from the water collector, and at least one lower lift tube extending through the closed bottom into the volume and configured to communicate water to the water collector, and
   a gas generator that is fluidly coupled to the at least one water lifting unit and configured to generate a gas that buoyantly moves water from the groundwater source and purifies the water as the water is buoyantly moved to a water consumer, wherein the buoyant movement of the water is a sole transport mechanism, and further wherein the gas is introduced into the lower lift tube and into the upper lift tube, the gas generator further comprising a water purification device that is configured to introduce a water purification agent into the gas at a predetermined rate to controllably release at least one of ozone, chlorine, a compound of chlorine, hydrogen peroxide, and a halide-based compound into the gas.

2. The water extraction and purification system of claim 1, wherein at least one water lifting unit further comprises:
a gas emitter tube in fluid communication with the gas generator and extending at least partially along a longitudinal length of each said lift tube; and
a gas emitter coupled to each said gas emitter tube that is configured to release the gas into the water to generate a gas-water mixture.

3. The water extraction and purification system of claim 2, wherein the at least one lower lift tube further comprises a filter device configured to be coupled to a portion of the at least one lower lift tube that is operable to prevent undesired solid material from entering the at least one lower lift tube.

4. The water extraction and purification system of claim 1, wherein the gas generator comprises one of a pressure vessel structured to contain the gas, a mechanical gas compression device, and a gas generator.

5. The water extraction and purification system of claim 4, wherein the mechanical gas compression device is coupled to a power supply that is operable to energize the mechanical gas compression device.

6. The water extraction and purification system of claim 1, wherein the gas generator comprises a chemical gas generator that is further operable to release a water purification agent.

7. A water extraction and purification system, comprising
at least one water lifting unit in fluid communication with a groundwater source, the water lifting unit including a water collector having an interior volume that is structured to retain a volume of the water, the water collector having a closed bottom and an open top, at least one upper lift tube extending through the open top into the volume and configured to remove water from the water collector, and at least one lower lift tube extending into the volume and configured to communicate water to the water collector, the water lifting unit configured to receive a compressed gas that buoyantly moves water from the groundwater source to a water consumer, wherein the buoyant movement of the water within the lift tube is a sole transport mechanism for the water, and further wherein the gas is introduced into the upper lift tube and the lower lift tube, and the compressed gas includes a water purification agent including an effective amount of at least one of ozone, chlorine, a compound of chlorine, hydrogen peroxide, and a halide-based compound.

8. The water extraction and purification system of claim 7, wherein the water lifting unit further comprises:
a gas emitter positioned within the lower lift tube and configured to release the compressed gas into the water to buoyantly transport the water within to the tube to the water collector.

9. A water extraction and purification system, comprising:
at least one water lifting unit that extends to a groundwater source, the water lifting unit including a water collector having an interior volume that is structured to retain a volume of the water, the water collector having a closed bottom and an open top, at least one upper lift tube extending through the open top into the volume and configured to remove water from the water collector, and at least one lower lift tube extending into the volume and configured to communicate water to the water collector, the water lifting unit being structured to receive a compressed gas that buoyantly moves water through the lifting unit and to water consumer, wherein the buoyant movement of the water within the lift tube is a sole transport mechanism for the water, and further wherein the gas is introduced into the upper lift tube and the lower lift tube, the compressed gas including an effective amount of a water disinfection agent including at least one of ozone, chlorine, a compound of chlorine, hydrogen peroxide, and a halide-based compound.

10. The water extraction and purification system of claim 9, wherein the water lifting unit further comprises:
a gas emitter positioned within the lower lift tube and configured to release the compressed gas into the water to buoyantly transport the water within the tube the water collector.

11. A water extraction and purification system, comprising:
at least one water lifting unit fluidly communicating with a groundwater source, the water lifting unit including a water collector having an interior volume that is structured to retain a volume of the water, the water collector having a closed bottom and an open top, at least one upper lift tube extending through the open top into the volume and configured to remove water from the water collector, and at least one lower lift tube extending into the volume and configured to communicate water to the water collector, the water lifting unit fluidly coupled to a compressed gas source operable to generate a compressed gas that buoyantly moves water through the lifting unit and to water consumer, wherein the buoyant movement of the water within the lift tube is a sole transport mechanism for the water, and further wherein the gas is introduced into the upper lift tube and the lower lift tube, and the compressed gas includes an effective amount of a water disinfection agent including at least one of ozone, chlorine, a compound of chlorine, hydrogen peroxide, and a halide-based compound.

12. The water extraction and purification system of claim 11, wherein the water lifting unit further comprises:
a gas emitter coupled to the compressed gas source and positioned within the lower lift tube to release the compressed gas into the water to buoyantly transport the water within the tube to the water collector.

* * * * *

UNITED STATES PATENT AND TRADEMARK OFFICE
CERTIFICATE OF CORRECTION

PATENT NO. : 7,297,254 B1 Page 1 of 1
APPLICATION NO. : 11/488206
DATED : November 20, 2007
INVENTOR(S) : Harrington et al.

It is certified that error appears in the above-identified patent and that said Letters Patent is hereby corrected as shown below:

On the Title page, item (73), in "Assignees", in column 1, line 2, delete "Katherine Reinlictner" and insert -- Katherine Reinleitner --, therefor.

On the Title page, item (74), in "Attorney, Agent, or Firm", in column 2, line 2, after "Woessner" delete "& Kluth".

Column 9, line 57, in Claim 8, after "within" delete "to".

Column 10, line 26, in Claim 10, after "tube" insert -- to --.

Signed and Sealed this

Eighth Day of April, 2008

JON W. DUDAS
*Director of the United States Patent and Trademark Office*